(12) United States Patent
Walls et al.

(10) Patent No.: US 7,251,534 B2
(45) Date of Patent: Jul. 31, 2007

(54) SYSTEM AND METHOD FOR COMMUNICATING DEVICE DESCRIPTIONS BETWEEN A CONTROL SYSTEM AND A PLURALITY OF CONTROLLED DEVICES

(75) Inventors: William R. Walls, Hartboro, PA (US); Kamel Zerdoum, Chalfont, PA (US); Brian Reynolds, Philadelphia, PA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/996,981

(22) Filed: Nov. 23, 2004

(65) Prior Publication Data
US 2005/0123884 A1 Jun. 9, 2005

Related U.S. Application Data

(60) Provisional application No. 60/526,660, filed on Dec. 4, 2003.

(51) Int. Cl.
*G05B 11/01* (2006.01)
*G08B 23/00* (2006.01)
*G06F 3/00* (2006.01)
*G06F 15/177* (2006.01)

(52) U.S. Cl. .................. 700/17; 700/12; 700/19; 340/517; 710/19; 715/736; 715/740; 715/965

(58) Field of Classification Search .............. 715/517, 715/522–524, 530, 531, 740, 733–738, 866, 715/965, 970; 710/15, 16, 19; 340/500, 340/501, 517; 700/11, 12, 17, 19, 65
See application file for complete search history.

(56) References Cited

U.S. PATENT DOCUMENTS

| | | | |
|---|---|---|---|
| 5,903,455 A | 5/1999 | Sharpe, Jr. et al. | |
| 6,446,202 B1 * | 9/2002 | Krivoshein et al. | 713/1 |
| 6,449,715 B1 | 9/2002 | Krivoshein | |
| 6,493,594 B1 | 12/2002 | Kraml | |
| 6,691,280 B1 * | 2/2004 | Dove et al. | 715/502 |
| 6,728,262 B1 * | 4/2004 | Woram | 370/466 |
| 6,971,072 B1 * | 11/2005 | Stein | 715/866 |
| 6,975,219 B2 * | 12/2005 | Eryurek et al. | 340/517 |
| 7,024,665 B2 * | 4/2006 | Ferraz et al. | 717/136 |
| 2004/0070599 A1 * | 4/2004 | Mori et al. | 345/735 |
| 2004/0255057 A1 * | 12/2004 | Opheim et al. | 710/15 |
| 2005/0047645 A1 * | 3/2005 | Funk et al. | 382/145 |
| 2005/0289276 A1 * | 12/2005 | Karschnia et al. | 710/305 |
| 2006/0150081 A1 * | 7/2006 | Seger et al. | 715/513 |

FOREIGN PATENT DOCUMENTS

JP 03292595 A * 12/1991
WO WO 02/077732 A1 10/2002

* cited by examiner

*Primary Examiner*—Crystal J. Barnes
(74) *Attorney, Agent, or Firm*—Ohlandt, Greeley, Ruggiero & Perle, LLP

(57) ABSTRACT

A system that employs a chosen one of a plurality of presentation selections to present information from a field device. The system has a field device interface that configures the field device in accordance with the chosen presentation selection. A control configurator programs the field device interface in accordance with the chosen presentation selection.

11 Claims, 4 Drawing Sheets

SYSTEM AND METHOD FOR COMMUNICATING DEVICE DESCRIPTIONS BETWEEN A CONTROL SYSTEM AND A PLURALITY OF CONTROLLED DEVICES

CROSS-REFERENCE TO RELATED APPLICATIONS

The present application is claiming priority of U.S. Provisional Patent entitled "SYSTEM AND METHOD FOR COMMUNICATING DEVICE DESCRIPTIONS BETWEEN A CONTROL SYSTEM AND A PLURALITY OF CONTROLLED DEVICES," Application Ser. No. 60/526,660, filed on Dec. 4, 2003, the content of which is incorporated by reference herein.

BACKGROUND OF THE INVENTION

1. Field of the Invention

The present disclosure relates to reading a field device, and more particularly, to presenting information concerning the field device in a presentation format chosen by an operator.

2. Description of the Related Art

There are various communication protocols known today that operate as "open standards." An "open standard" can be generally defined as a publicly available specification for achieving a specific task. By allowing anyone to use the standard, open standards help increase compatibility between various hardware and software components, since anyone with the technical know-how and the necessary equipment to implement solutions can build something that works together with those of other vendors.

In other words, these "open standards" allow devices and control systems from different manufactures to interoperate with each other through the use of open standards communication protocols. One such communication protocol, for example, is the HART® communication protocol, defined by the HART Communication Foundation's specifications. Generally, HART allows for the standardization of communications in a control system between various devices, masters, and slaves within a control system, even if the various devices, and so on, are manufactured by different manufacturers.

Some components of the HART communication protocol open standard are classified as "Common Functions," which require conformance to all the requirements defined in the standard for the defined common functions. This allows the interface between hosts and slaves to only require a single interface layer to support a variety of slave devices from many distinct vendors. However, other components of the open standard are classified as "device-specific," and the standard is defined by the individual device manufacturer.

For the class of data transfer associated with "device-specific" transfers, the data typically has embedded within diagnostic information and status information specific to the device model or specific version associated therewith. The host system tends to treat this data in a generic way to simplify the interface. This is done using Device Description (DD) files and the DD files are supplied by the manufacturers. The specific content is determined by the manufacturers. However, the information DD file contains must be presented as defined by the HART communication protocol.

However, this diagnostic information and status information data is at times very large, and can be unwieldy. Furthermore, the diagnostic and status information data conveys abnormal conditions detected by the specific devices with varying degrees of urgency, and the normal or abnormal condition can vary widely in importance to the operator and the processes that they are monitoring and controlling. However, similar devices manufactured by different manufacturers can convey the occurrence of similar abnormal situations with varying degree of urgency, which can be disadvantageous to the end operator.

Conventional control system engineering and operation tools provide a somewhat generic method using the DD files. The control system will either classify all conditions reported by the individual field devices as either "journaled" notifications, "alarmed" notifications or both.

When using the former, an operator will typically need to explicitly navigate to a specific area of the operational part of the system and to find, view and address the detected condition. In other words, the operator will have to navigate through the journal. In contrast, when using the latter approach, the operator is immediately alerted for each detected condition by either an audible or a visual means. The problem with these approaches is that the first approach could delay the operator's response to an urgent situation within the plant and the second approach could cause the operator to be overwhelmed or become complacent, hence, missing urgent situations.

Therefore, there is a need for data presentation that can be tailored, by the operator, for a given device make and model and for each version of a device at configuration or update time. In a further embodiment, the data presentation allows the operator to classify and reclassify, if necessary, each bit of information based on the operator and plant specific requirements and needs.

SUMMARY OF THE INVENTION

The present invention provides for employing one of a plurality of presentation selections to read information from a field device. A field device interface is employable to configure the field device in accordance with the chosen one of the plurality of presentation selections. A configuration controller is employable to program the field device interface in accordance with chosen one of the plurality of presentation selections.

DETAILED DESCRIPTION OF THE PREFERRED EMBODIMENT

The term "module" is used herein to demarcate a functional operation that may be embodied either as a stand-alone component or as one of a plurality of modules in an integrated assembly.

Figure 1:
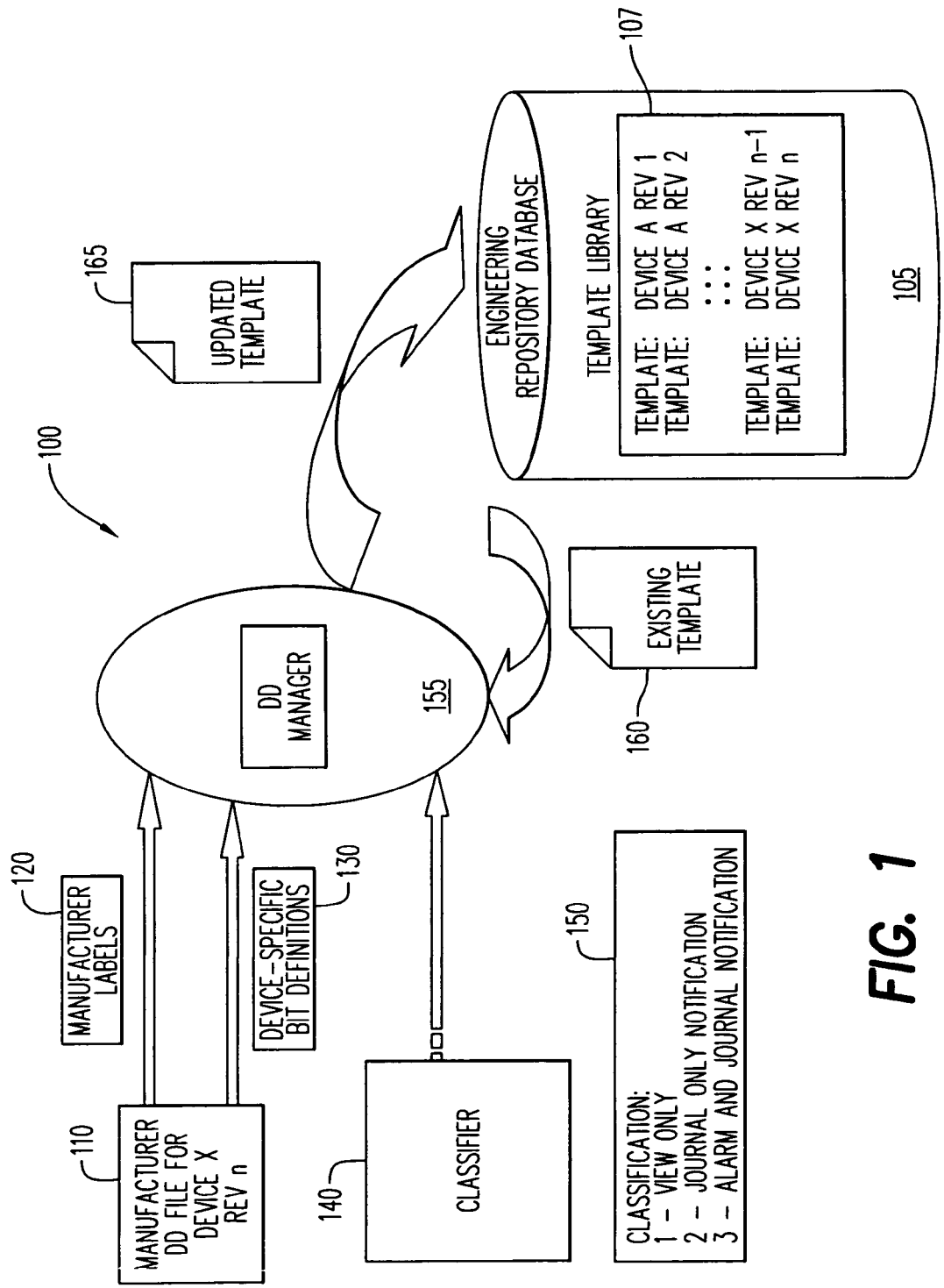
FIG. 1 illustrates a system for processing "command 48" device-specific data and to present it to an operator according to the operator's specifications.

Turning now to FIG. 1, illustrated is a system 100 for presenting command device-specific data to an operator according to the operator's specifications. It should be noted that the explanation below uses the HART(D "Command 48" device-specific open-source classification to aid in the understanding of the detailed description. It will be appreciated by those skilled in the art, however, that system 100, as described, can be applied effectively to other systems and devices, and with other communication protocols.

System 100 can be used to customize the presentation of command device-specific data by customizing a label of a HART "Command 48" device-specific bit. Generally, up to 200 individual bits of information can be placed within one label command 48 response. Each bit typically identifies a single Boolean (true or false) condition about the device. For example, a single bit may be used to indicate that the device is operating above its intended upper temperature limit. This customized label manifests itself to the operator as additional or different information about the item labeled to the operator. Furthermore, system 100 allows the operator to change or update the presentation of various device-specific diagnostic and status data. System 100 uses several components, some of which are existing components within the host control system.

In system 100, a manufacturer's DD file for a device "X" and revision "N" file 110 (DD file 110) are conveyable to a Device Description (DD) manager 155. Generally, DD Manager 155 is invoked by an operator, at a device template building time, to assign manufacturer labels 120, as needed and allowed by a predefined set of system notification criteria. Manufacturer labels 120 are then ultimately read by an operator when different conditions arise.

In system 100, DD manager 155 receives manufacturer labels 120 from DD file 110 when creating initial templates that contain a configuration for interfacing with field devices. The configuration includes instructions for presentation of data from the field device. In system 100, DD manager 155 also receives device-specific bit definitions 130 from DD file 110 when creating the initial templates for a configuration. The specific bit definitions are determined by each manufacturer, and the bits can be different for every different model that the manufacturer sells. Each bit corresponds to a particular condition for the device. When a bit is ON (TRUE), a condition is TRUE.

Manufacturer labels 120 typically correspond to a manufacturer's specific text for normal or abnormal conditions when invoked in accordance with device-specific bit definition 130. Manufacturer labels 120 can be new, or they can update the existing labels. DD Manager 155 can also be invoked to update an existing template 160, thereby allowing the operator to modify previously operator-defined labels or command device-specific bit definitions. The manufacturer labels 120 and device-specific bit definition 130 are used to generate an updated template 165, which is saved in a template library 107 within an engineering repository database 105. Template library 107 could have template device names and various revisions, such as "Device A Rev 1" through "Device X Rev n."

In other words, in system 100, DD manager 155 can receive from an engineering repository database 105 existing template 160 for a particular field device. DD manager 155 revises existing template 160 based on manufacturer labels 120 and device-specific bit definition 130 to updated template 165 so as to contain any new configuration information classification. Updated template 165 is saved in engineering repository database 105. In an alternative embodiment, DD manager 155 generates a new template combined with information from DD file 110.

However, DD manager 155 also has received from an operator a specified notification classification selection from a classifier 140. Classifier 140 can associate a classification 150 with the presentation of a given output of a field device. This association is then conveyed to DD manager 155. Classification 150 relates to the desired presentation of information to an operator when a control system detects abnormal conditions, although routine diagnostics can also be included in a desired presentation.

A first presentation selection of classification 150 employs a "view only" parameter. "View only" means that the detected condition is viewed or otherwise perceived by the operator, but no journal entry is performed and no alarm state is indicated. In this "view only" presentation selection, the display presentation status is invoked and device-specific information, such as status, is segregated from other information not needed by the operator during the day-to-day activities. For instance, static, unchanging configuration data typically does not typically need to be raised to an alarm or journal entry. One such example would be if a device is configured for 2-wire or 4-wire operation. It's nice to know, but it does not matter enough to warrant either a journaled event or an alarm.

A second presentation selection of classification 150 employs a "journal only" notification, which is a subset of a "view only" parameter. "Journal only" means that the detected condition is, or status is, journaled, but with no alarm and no other impingement upon the perception of the operator. This "journal only" notification can be used for the situations that are not critical to system/process operation, but necessary for journaling and historization of future reporting and analysis.

A third presentation selection of classification 150 employs an "alarm and journal" notification to the operator. "Alarm and journal" means that an alarm is sounded for the operator, and a journal entry is also made. "Alarm and journal" selection is used for those abnormal conditions critical to safety and robust operation of the system, with journalizing and historization possibilities for future reporting and analysis. The "alarm and journal" presentation, in one embodiment, also has operator acknowledgment of the "alarm and journal" status. In a further embodiment, the operator acknowledgment is itself also journalled.

Furthermore, classifier 140 can input new labels, or update existing labels. In a further embodiment, for building templates or instantiations of templates, DD Manager 155 uses the device-specific bit definitions 130 from the HART Device Description Data, and can combine this with operator and operator labels input from classifier 140 to classify each command device-specific bit to generate updated template 165. Presentation of information to the operator, either manufacturer labels 120 or operator specific labels, correspond to a presentation selection as stored within classification 150, which was placed within updated template 165.

Generally, at system/device configuration time, updated template 165 is instantiated by existing engineering tools which distribute the pertinent configurations to the various system modules, such as field devices and interfaces, as defined by the operator and manufacturer within the open standards. System 100 also uses existing templates 160 residing in engineering repository database 105, in concert with existing system components, to then gather and process command device-specific data and present it to the operator as per his/her presentation selection.

Figure 2:
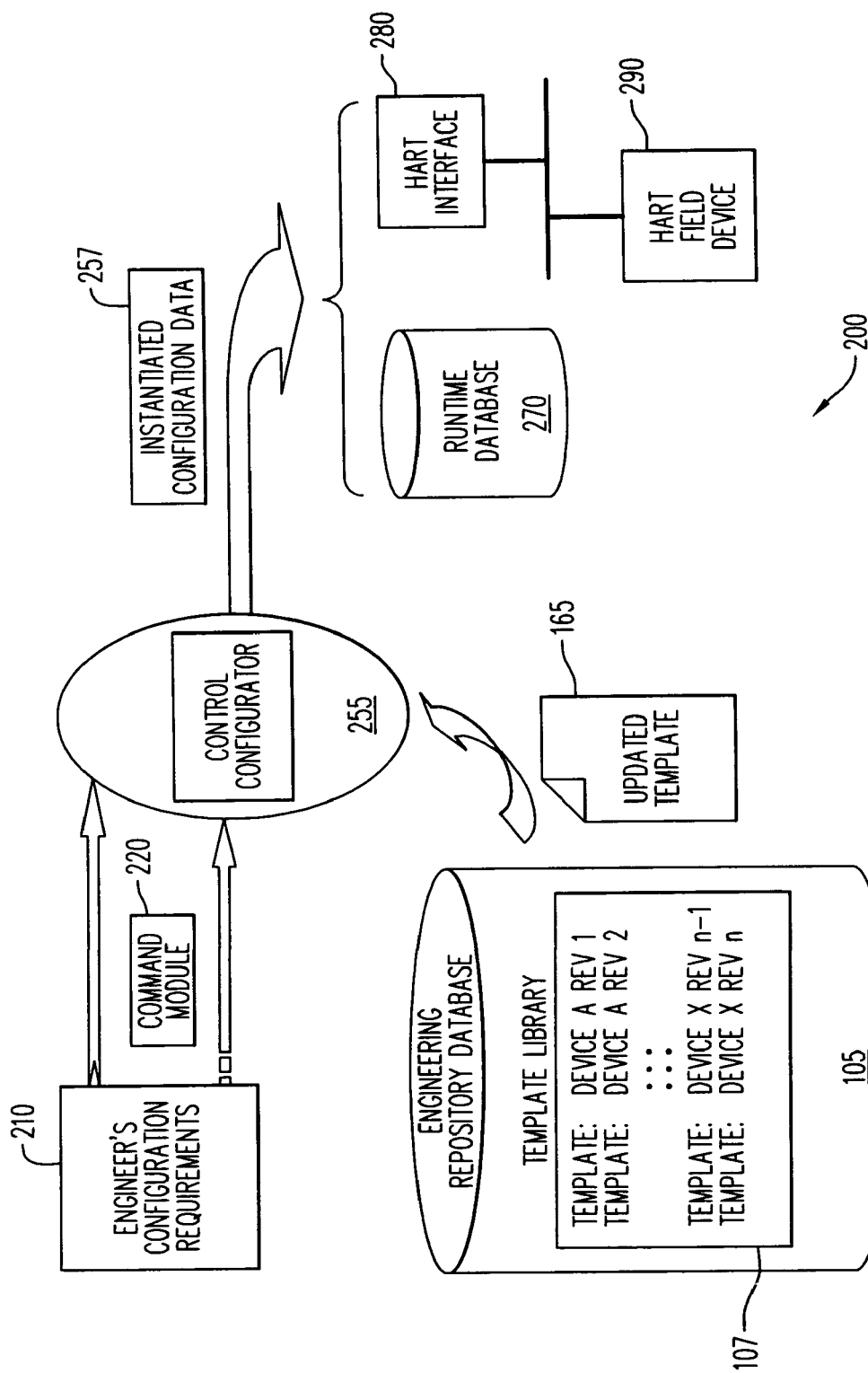
FIG. 2 is a system used to process "command 48" device-specific data and present it to operators according to operator specifications.

Turning now to FIG. 2, illustrated is a system 200 employable to employ protocols, such as HART® "Command 48" device-specific protocols, to configure a HART interface and a HART device. The HART interface and the HART device are configured to convey specific data with an indicator flag, to initiate a particular presentation for the given specific data type.

In system 200, a command module 220 tells a control configurator 255 to initiate instantiation of a given template loaded from an engineering configuration requirement 210. Generally, control configurator 255 is used to help program various interfaces, such as a HART interface 280, with an instantiated template so that an operator can be notified according to the operator's chosen presentation selection.

More specifically, in the system 200, engineering repository database 105 receives a command to retrieve updated template 165. Updated template 165 will contain classification 150 of system 100 and other data within classifier 140, as well as other device configuration data, such as DD file 110. Updated template 165 will typically be the most updated version of the templates, for instance, "Device X Revision n" of system 200. Updated template 165 is then sent to control configurator 255, which instantiates updated template 165, and creates an instantiated configuration data 257 out of it.

Instantiated configuration data 257 is then loaded to the various components of the system 200. In particular, HART interface 280 receives the corresponding labels and bit definitions for the HART device-specific data. Control configurator 255 loads instantiated configuration data 257, including the presentation selection of classification 150, both an interface, such as HART interface 280, and a field device, such as a HART field device 290. Instantiated configuration data 257 is also loaded to a runtime database 270.

Runtime database 270 is generally used to help operate HART interface 280 and HART field device 290. More specifically, when an operator orders the configuration of HART field device 290, specific information from instantiated configuration data 257 is extracted. The extracted data can include "device type" and "revision type" of HART field device 290. Generally, HART interface 280 allows HART field device 290 to interface with a control system and to present device data according to both the HART protocol and the presentation selection contained within classification 150. In system 200, this means that HART field device 290 or HART interface 280 is configured to convey status data, along with an indication of how that data is to be presented to the end operator. In other words, the presentation selected by the end operator for a given piece of information is also loaded to HART interface 280 and/or HART field device 290.

Figure 3:
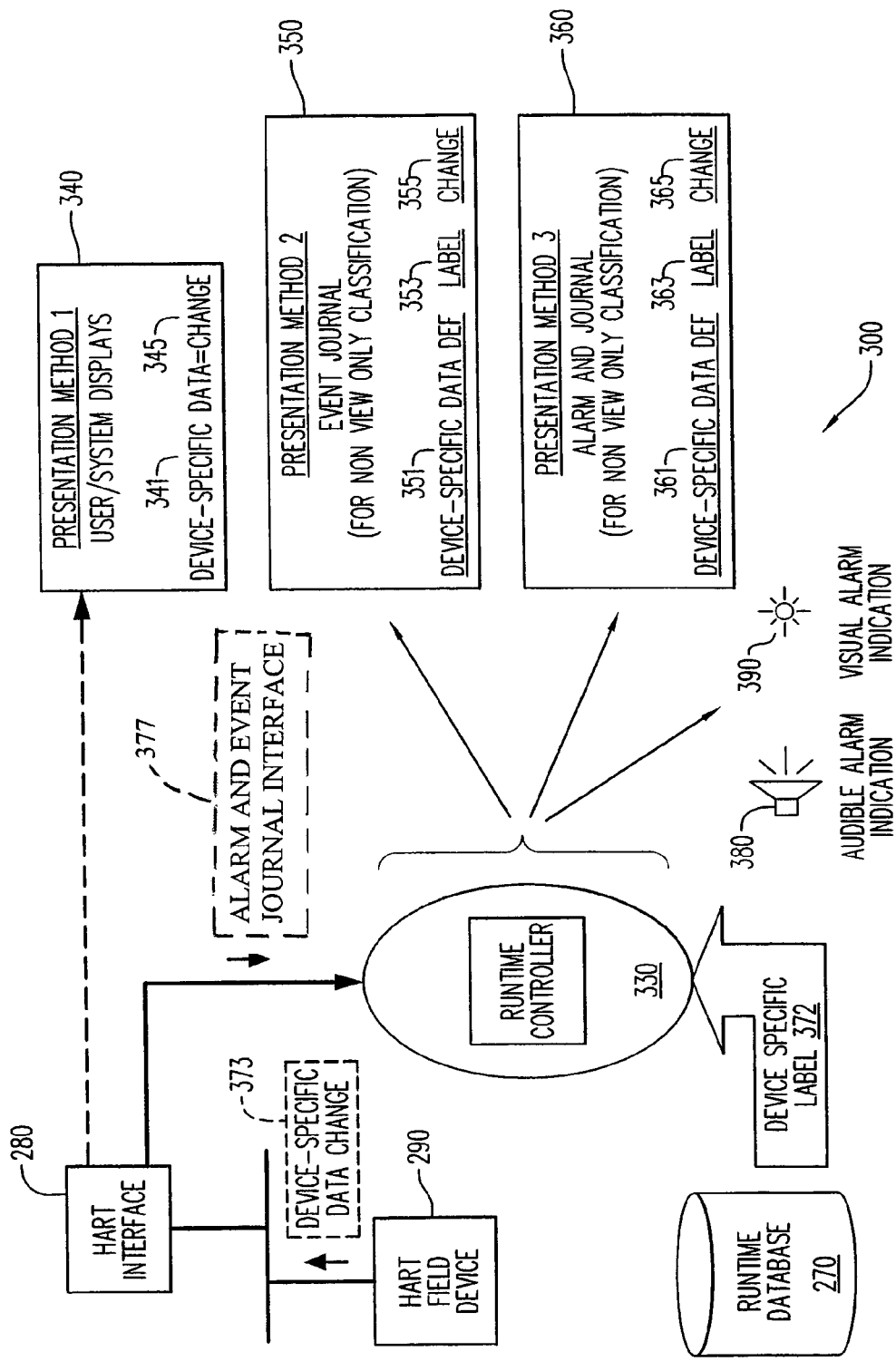
FIG. 3 illustrates a system for presenting the "command 48" device-specific data according to operator specifications.

Turning now to FIG. 3, illustrated is a system 300 for indicating device-specific abnormal conditions, changes of information concerning field device characteristics, or field device status checks to a operator, according to the operator's presentation selection preference.

Generally, when a HART field device 290 detects a device-specific abnormal condition, status change or otherwise performs a status check, a coupled HART field device interface 280 processes the bit relating to the device-specific abnormal situation (and so on) of a device-specific data change 373 by notifying a coupled runtime controller 330 of the situation, which in turn updates coupled runtime database 270.

Generally, one bit is used to describe one specific abnormal situation. However, an abnormal situation may raise several abnormal bits. For example, HART device 290 is being used to measure pressure within a vessel. HART device 290 will often monitor the temperature of the ambient air surrounding the HART device 290 because the pressure it can measure is affected by the ambient temperature. Should the ambient temperature be outside of the operating range of the HART device 290, a bit indicating so will be raised in command 48. At the same time, the HART device may begin to "gracefully" malfunction and set other command 48 bits indicating that the pressure readings cannot be fully trusted.

In any event, based on previously chosen classification 150, such as indicated during the load action performed at the configuration time of system 100, HART field device interface 280 performs the following. In system 300, when HART field device 290 indicates a condition, HART field device interface 280 reads the classification 150 associated with that information as loaded during configuration.

If classification 150 is "view only," then the operator is notified visually, perhaps in real time. HART field device interface 280 sends a "display only" notification along with the corresponding label form, to a display only monitor 340. Within display only monitor 340 there is displayed a device-specific data parameter 341 and its equivalent change 345. A change in value in 373 will result in a change to the data parameter 341. The specific value of the change is shown in 345.

However, if classification 150 is not "view only," then classification 150 is conveyed to runtime controller 330. Runtime controller 330 then reads classification 150 to determine if it is a "journal" selection or an "alarm and journal" selection. Runtime controller 330 invokes a device specific label 372 associated with HART field device 290 from runtime database 270, and the retrieved corresponding data, in its corresponding label form is presented in either "journal only" format or "alarm and journal" format, as specified by classification 150.

If classification 150 is set to "journal only," HART field device interface 280 sends a "journal only" notification, to which it adds the corresponding label form and the information that triggered the notification. This notification is then sent to runtime controller 330. Runtime controller 330 then logs this information using an event journal 350. Then, event journal 350 records the status change and/or status check, and any other pertinent associated information. This can include the label of the device, the various device specific data itself, and the change or status check that occurred. In one embodiment, within event journal monitor 350 there is displayed a device-specific data definition 351, a corresponding event label 353 and a journal change 355. A device-specific data change 373 will result in a change to the data parameter 351. The specific value of the change is shown in 355.

Alternatively, if classification 150 is set to "alarm and journal", a non-view only classification, HART field device interface 280 sends an "alarm and journal" notification, to which HART field device interface 280 adds the corresponding label form, to runtime controller 330. Runtime controller 330 then logs this information using an alarm and event journal interface 377. Alarm and event journal interface 377 records the status change, check, and any other pertinent associated information. This pertinent associated information can include the label of the device, the various device specific data itself, and the change or status check that occurred.

For the "alarm" portion of alarm and event journal interface 377, when runtime controller 330 receives a device-specific notification of an alarm event, alarm and event journal interface 377 can invoke an audible alarm indication 380. Alternatively, runtime controller 330 can invoke audible alarm indication 380. In a further embodiment, alarm and event journal interface 377 also invokes a visual alarm indication 390. The manner of the alarm, either audible alarm indication 380 or visual alarm indication 390, can be specified by instantiated configuration data 257 employed by HART field device interface 280. In one embodiment, within alarm and journal interface 360 there is displayed a device-specific data definition 361, a corresponding label 363 and a journal change 365. A change in value in 373 will result in a change to the data parameter 361. The specific value of the change is shown in 365.

Figure 4:
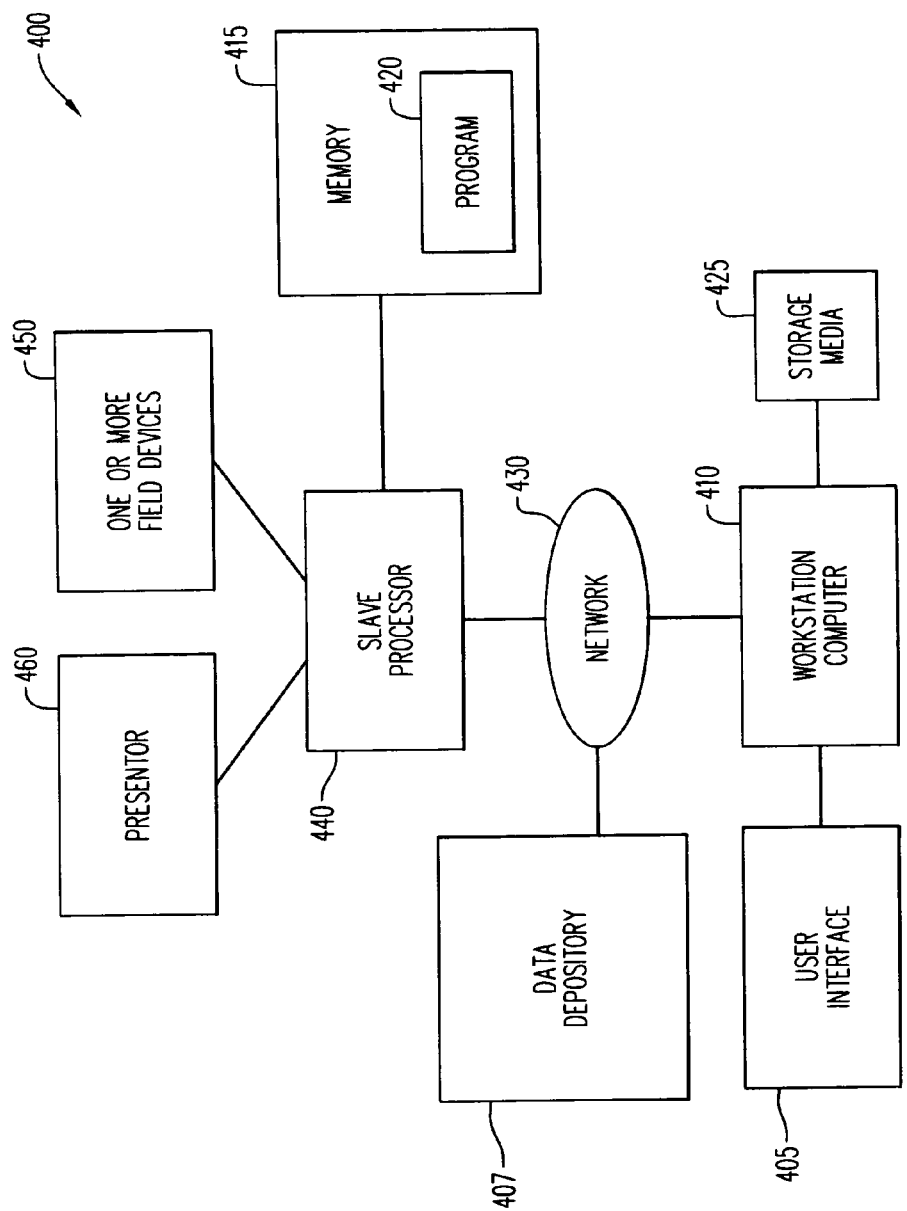
FIG. 4 illustrates a computer system for running a program to specify based upon status notifications.

Turning now to FIG. 4, illustrated is a block diagram of a computer system 400 adapted for employment of classification 150 concerning data from one or more field devices 450. Computer system 400 includes a workstation computer 410, with a storage media 425 and a user interface 405 coupled to workstation computer 410. Computer system 400 may be implemented on a general purpose microcomputer, such as one of the members of the Sun™ Microsystems family of computer systems, one of the members of the IBM™ Personal Computer family, or any conventional work-station or graphics computer device User interface 405 includes an input device, such as a keyboard or speech recognition subsystem, for enabling a user to communicate information and command selections to workstation computer 410. User interface 405 also includes an output device such as a display or a printer. A cursor control such as a mouse, track-ball, or joy stick, allows the user to manipulate a cursor on the display for communicating additional information and command selections to workstation computer 410 and can provides a hardcopy of user interface 405 data via a printer. User interface 405 be used to input DD file 110, manufacturer labels 120, new labels designed by classifier 140, classification 150, engineering configuration requirement 210, and so on.

Workstation computer 410 is coupled to a network 430. Network 430 is also coupled to a data depository 407. Data depository 407 typically includes engineering repository database 105, and runtime database 270. Network 430 is also coupled to a slave processor 440. Slave processor 440 is coupled to a memory 415. Memory 415 is a memory for storing data and instructions for controlling the operation of slave processor 440. An implementation of memory 415 could include a random access memory (RAM), a hard drive and a read only memory (ROM). One of the components of memory 415 is a program 420. Slave processor 440 is also coupled to one or more field devices 450 and presentors 460. Presentors 460 include display only monitor 340, event journal 350, and alarm and event journal interface 377.

Program 420 can include instructions for controlling slave processor 410. As a result of execution of program 420, slave processor 410 can send instantiated configuration data 257 to one or more filed devices 450. Instantiated configuration data 257 includes classification 150. Slave processor 440 also receives data from HART interface 280, determines the selection of classification 150 that is associated with the data, and activates either the display only monitor 340, event journal 350, or alarm and event journal interface 370, as appropriate. Slave processor 440 also can update simultaneously update data depository 407 with ongoing status information. Program 420 may be implemented as a single module or as a plurality of modules that operate in cooperation with one another.

While program 420 is indicated as already loaded into memory 415, it may be configured on a storage media 425 for subsequent loading into memory 415 by way of network 430. Storage media 425 can be any conventional storage media such as a magnetic tape, an optical storage media, a compact disk, or a floppy disk. Alternatively, storage media 425 can be a random access memory, or other type of electronic storage, located on a remote storage system.

It should be understood that various alternatives, combinations and modifications of the teachings described herein could be devised by those skilled in the art. The present invention is intended to embrace all such alternatives, modifications and variances that fall within the scope of the appended claims.

What is claimed is:

1. A system for presenting information concerning a field device to an operator, said system comprising:
  a user interface that responds to a user input to select at least one of a plurality of presentation formats comprising a view only presentation format, a journal only presentation format, and an alarm and journal presentation format, or any combination thereof;
  a field device interface employable to configure said field device in accordance with said selected one of said plurality of presentation formats;
  a control configurator employable to program said field device interface in accordance with said selected one of said plurality of presentation formats; and
  wherein said field device interface responds to an abnormal event detected by said field device to communicate notification of said abnormal event with said selected one of said plurality of presentation formats to said operator.

2. The system of claim 1, further comprising a runtime database coupled to said field device interface.

3. The system of claim 2, further comprising a runtime controller coupled to said runtime database.

4. The system of claim 1, further comprising an engineering repository database coupled to said control configurator.

5. The system of claim 4, further comprising a device description manager coupled in circuit to said control configurator.

6. The system of claim 5, wherein said device description manager receives a device description file.

7. The system of claim 6, wherein said device description file comprises manufacturer labels.

8. A system for presenting information concerning a field device to an operator, said system comprising:
  a user interface that responds to a user input to select at least one of a plurality of presentation formats comprising a view only presentation format, a journal only presentation format, and an alarm and journal presentation format, or any combination thereof;
  a field device interface employable to configure said field device in accordance with said selected one of said plurality of presentation formats; a control configurator employable to program said field device interface in accordance with said selected one of said plurality of presentation formats;
  a runtime controller coupled to a runtime database, wherein said selected presentation format is a journal only presentation selection and wherein said runtime controller is employable to use a monitor for said journal only presentation format.

9. A method for presenting information to an operator of a control system, comprising:
  selecting at least one presentation format from a plurality of presentation formats comprising a view only presentation format, a journal only presentation format, and an alarm and journal presentation format, or any combination thereof;

configuring a field device of said control system to indicate that said information is to be presented in said selected presentation format; and in response to a detection of an abnormal event by said field device, communicating a notification of said abnormal event with said selected presentation format to said operator.

10. The method of claim 9, further comprising associating a label with said notification.

11. A computer readable storage medium comprising instructions for controlling a processor to:

cause a user interface to respond to a user input to select at least one of a plurality of presentation formats comprising a view only presentation format, a journal only presentation format, and an alarm and journal presentation format, or any combination thereof; and control a configurator to employ a field device interface to configure a field device in accordance with said selected one of a plurality of presentation formats; and program said field device interface in accordance with said selected one of said plurality of presentation formats;

control said field device interface to respond to an abnormal event detected by said field device to communicate notification of said abnormal event with said selected one of said plurality of presentation formats to an operator.

* * * * *